(12) United States Patent
Maunula (10) Patent No.: US 10,068,450 B2
(45) Date of Patent: Sep. 4, 2018

(54) ARRANGEMENT, SYSTEM AND METHOD FOR REDUCING THE EFFECT OF INTERFERENCE AT RADIO FREQUENCIES IN AN ELECTRONIC PRICE LABEL SYSTEM

(71) Applicant: MARIELLA LABELS OY, Vantaa (FI)

(72) Inventor: Vesa Maunula, Helsinki (FI)

(73) Assignee: MARIELLA LABELS OY, Vantaa (FI)

( * ) Notice: Subject to any disclaimer, the term of this patent is extended or adjusted under 35 U.S.C. 154(b) by 0 days.

(21) Appl. No.: 15/127,167

(22) PCT Filed: Mar. 5, 2015

(86) PCT No.: PCT/FI2015/050140
§ 371 (c)(1),
(2) Date: Sep. 19, 2016

(87) PCT Pub. No.: WO2015/144980
PCT Pub. Date: Oct. 1, 2015

(65) Prior Publication Data
US 2017/0124826 A1    May 4, 2017

(30) Foreign Application Priority Data
Mar. 26, 2014 (FI) ..................... 20145278

(51) Int. Cl.
*G08B 13/14* (2006.01)
*G08B 13/24* (2006.01)
(Continued)

(52) U.S. Cl.
CPC ....... *G08B 13/246* (2013.01); *G06K 7/10019* (2013.01); *H04B 15/04* (2013.01); *H04W 4/80* (2018.02); *G08B 13/24* (2013.01)

(58) Field of Classification Search
CPC .. G08B 13/246; G06K 7/10019; H04W 4/008
(Continued)

(56) References Cited

U.S. PATENT DOCUMENTS

| 5,930,683 A | 7/1999 | Plocher |
| 7,152,040 B1 | 12/2006 | Hawthorne et al. |

(Continued)

FOREIGN PATENT DOCUMENTS

| FI | 20050192 A | 8/2006 |
| KR | 10-2010-0013174 A | 2/2010 |

(Continued)

OTHER PUBLICATIONS

Search Report issued in related Finnish Patent Application No. 20145278 dated Oct. 29, 2014 (in English).
(Continued)

*Primary Examiner* — Naomi J Small
(74) *Attorney, Agent, or Firm* — Birch, Stewart, Kolasch & Birch, LLP (57) ABSTRACT

An arrangement, system and method for reducing the effect of interference at radio frequencies in an electronic price label system. The arrangement includes an electronic price label system, which includes a base station equipped with at least a radio transmitter and a radio receiver as well as a set of electronic price labels that receive and reflect back radio signals from the base station. The electronic price label system is connected to an electronic article surveillance system which includes a detector device which is able to detect electronic article surveillance tags, and which electronic article surveillance system further includes an activation device for changing a state of the detector device between an activated-state and a deactivated state. The electronic price label system is configured to start transmitting transmissions from base stations and/or electronic labels
(Continued)

only when the detector device of the electronic article surveillance system is in the deactivated state.

20 Claims, 4 Drawing Sheets (51) Int. Cl.
*H04B 15/04* (2006.01)
*H04W 4/80* (2018.01)
*G06K 7/10* (2006.01)

(58) Field of Classification Search
USPC ........................................................ 340/572.1
See application file for complete search history.

(56) References Cited

U.S. PATENT DOCUMENTS

| 2008/0049947 | A1 | 3/2008 | Forster |
| 2009/0051534 | A1* | 2/2009 | Aguirre .............. G08B 13/2488 340/572.1 |
| 2009/0179825 | A1 | 7/2009 | Enarvi et al. |
| 2009/0303009 | A1* | 12/2009 | Itasaki ..................... H04Q 9/00 340/10.1 |
| 2011/0053517 | A1 | 3/2011 | Wright et al. |
| 2011/0084951 | A1* | 4/2011 | Karhuketo ............ G06F 1/3203 345/211 |
| 2013/0343326 | A1 | 12/2013 | Kivinen |
| 2014/0203936 | A1* | 7/2014 | Rasband ............ G08B 13/2465 340/572.3 |
| 2014/0225734 | A1* | 8/2014 | Rasband .............. G08B 13/246 340/572.1 |
| 2014/0266629 | A1* | 9/2014 | Easter ................ G08B 13/2411 340/10.3 |

FOREIGN PATENT DOCUMENTS

| RU | 2581564 C2 | 4/2016 |
| WO | WO 2004/034347 A1 | 4/2004 |
| WO | WO 2008/045570 A2 | 4/2008 |
| WO | WO 2013/153282 A1 | 10/2013 |
| WO | WO 2013/192033 A1 | 12/2013 |

OTHER PUBLICATIONS

International Search Report, issued in PCT/FI2015/050140, dated May 19, 2015.
Written Opinion of the International Searching Authority, issued in PCT/FI2015/050140, dated May 19, 2015.
English translation of a Russian Search Report for counterpart Russian Application No. 2016137255, dated Mar. 26, 2018.

\* cited by examiner

ARRANGEMENT, SYSTEM AND METHOD FOR REDUCING THE EFFECT OF INTERFERENCE AT RADIO FREQUENCIES IN AN ELECTRONIC PRICE LABEL SYSTEM

FIELD OF THE INVENTION

The invention relates to an arrangement, system and method for reducing the effect of interference at radio frequencies in an electronic price label system.

BACKGROUND OF THE INVENTION

Conventionally, the price information on price tags in shops is always changed manually when the price of the product is changed. The new prices are printed out on paper or a corresponding material, and these tags with their new price markings are placed manually in a location reserved for the price tags on shelves in the sales premises. Thus, an employee must first find the correct location of the price tag to be updated, after which the previous price tag is removed and discarded and the new price tag is inserted in its position. A disadvantage in this arrangement is, among other things, the fact that the arrangement is very laborious and there is a high risk of mistakes. In case of a mistake, a situation may, for example, occur, in which the price information on the price tags on the shelves conflicts with the price information in the cash register system.

To avoid the above-mentioned drawbacks, electronic systems have been developed, in which electronic price display units and their electronic displays are provided on the front edge or above the shelves, close to the products, in which the price information of the products can be changed in a centralized manner from the control centre of the system, or the like. This will facilitate and accelerate the updating of the price information to a significant extent. The data on the displays can be updated in a cabled or wireless manner, depending on the system. Cabled systems involve the problem that a wire connection must be provided for each display for data transmission and possibly also for power supply. For example in a normal retail outlets for daily consumer goods, the number of displays is relatively large; consequently, there must also be a large number of wires, which causes problems and limitations, for example, on the placement of the price displays.

Wireless systems do not require complex wirings but, in turn, they require transponders equipped with antennas in connection with battery-driven price displays, for communicating with the control unit of the system via suitable base stations.

When the aim is to minimize the power consumption of the price display units and thereby to extend the service life of their batteries, one method in the communication between the bases stations and the price display units is such in which the transducer placed in the price display units does not, by itself, implement active radio transmission so that the transmission power would be supplied from a separate power supply of the price display unit, but the price display unit only reflects the radio transmission of the base station at a given moment of time and in a given way. The price display unit can change the reflectance of its own antenna, wherein the price display unit is capable of acknowledging or responding to messages of the base station by simple reply messages. In the following, such a communication method will be described on a general level.

The base station communicate with the price display units by transmitting signals which are listened to by all the price display units and from which a single display unit identifies a command relating to itself on the basis of a given display unit specific identification. After receiving a command relating to itself, the single price display unit responds to the base station by reflecting the transmission of the base station itself back to the base station, changed by a phase shift caused by a given time delay and at a given moment of time. Typically, after transmitting a command intended for a given price display, the base station starts to transmit, for example, a carrier wave of a given type for a given period of time, the carrier wave being reflected back, with a given phase shift, by the price display that recognized the command. Consequently, the base station is capable of identifying the reflected response as belonging to a given price display, because it knows to expect it within a given period of time after sending a unique command to said display. From its own transmission, the base station can separate the reflected response that is significantly weaker in power, on the basis of the phase shift produced by the display device.

Because these reflected response signals are typically very weak and they can be disturbed and suppressed by other ambient reflections or signals, there is a need to reduce the effect of other interference sources on this communication by all possible means.

Also radio-frequency based electronic article surveillance systems are known which are used to prevent shoplifting from retail stores, pilferage of books from libraries or removal of properties from office buildings. Special tags are fixed to merchandise or books and these tags are removed or deactivated by the clerks when the item is properly bought or checked out. At the exits of the store, a detection system sounds an alarm or otherwise alerts the staff when it senses active tags.

If electronic article surveillance systems and electronic price label systems operate at same frequency band they can cause interference to each other. This can have e.g. such effect that the electronic article surveillance system is not able to detect electronic article surveillance tags and electronic price label system is not able to update prices displayed in electronic price labels. This is problematic because usually both systems are designed to be used in retail environment.

SUMMARY OF THE INVENTION

It is an aim of the present invention to solve the above-mentioned problems and simultaneously provide an arrangement and method for an electronic price label and electronic price label system. The arrangement according to the invention is characterized in what will be presented in the characterizing part of claim 1. The electronic price label system is characterized in what will be presented in the characterizing part of claim 13. The method according to the invention is characterized in what will be presented in the characterizing part of claim 16. Other embodiments of the invention are characterized in what will be presented in the other claims.

The present invention solves problems of prior art by providing an arrangement for reducing the effect of interference at radio frequencies in an electronic price label system. The electronic price label system comprises base station equipped with at least a radio transmitter and a radio receiver as well as a set of electronic price labels that receive and reflect back the radio signals from the base station. The electronic price label system is connected to an electronic article surveillance system which comprises detection means which are able to detect electronic article surveillance tags. The electronic article surveillance system further comprises activation means for changing state of detection means between activated-state and deactivated state. The electronic price label system is configured to start transmitting transmissions only when detection means of the electronic article surveillance system are in deactivated-state.

In one embodiment of the invention the electronic price label system is configured to stop new and/or ongoing transmissions from base stations and electronic labels when state of detection means is changed from deactivated to activated.

In one embodiment of the invention the electronic price label system is configured to continue ongoing transmission and stop transmitting after ongoing transmissions have been transmitted.

In one embodiment of the invention the detection means are configured to detect electronic article surveillance tags when detection means are in activated state. The detection means can comprise e.g. security ports.

In one embodiment of the invention the activation means comprise at least one sensor for detecting presence and/or movement of a person at certain area, e.g. at the exit area of a store.

In one embodiment of the invention the sensor of activation means is a movement sensor, an infrared gate sensor and/or a floor sensor.

The advantage of the solution of the present invention is that electronic price label system and electronic article surveillance system can operate reliably in the same environment without causing interference to each other even when they are operating in a same frequency or same frequency band.

DESCRIPTION OF THE DRAWING

In the following, the invention will be described in more detail by means of an embodiment example with reference to the appended drawings, in which.

DETAILED DESCRIPTION OF THE INVENTION

Figure 1:
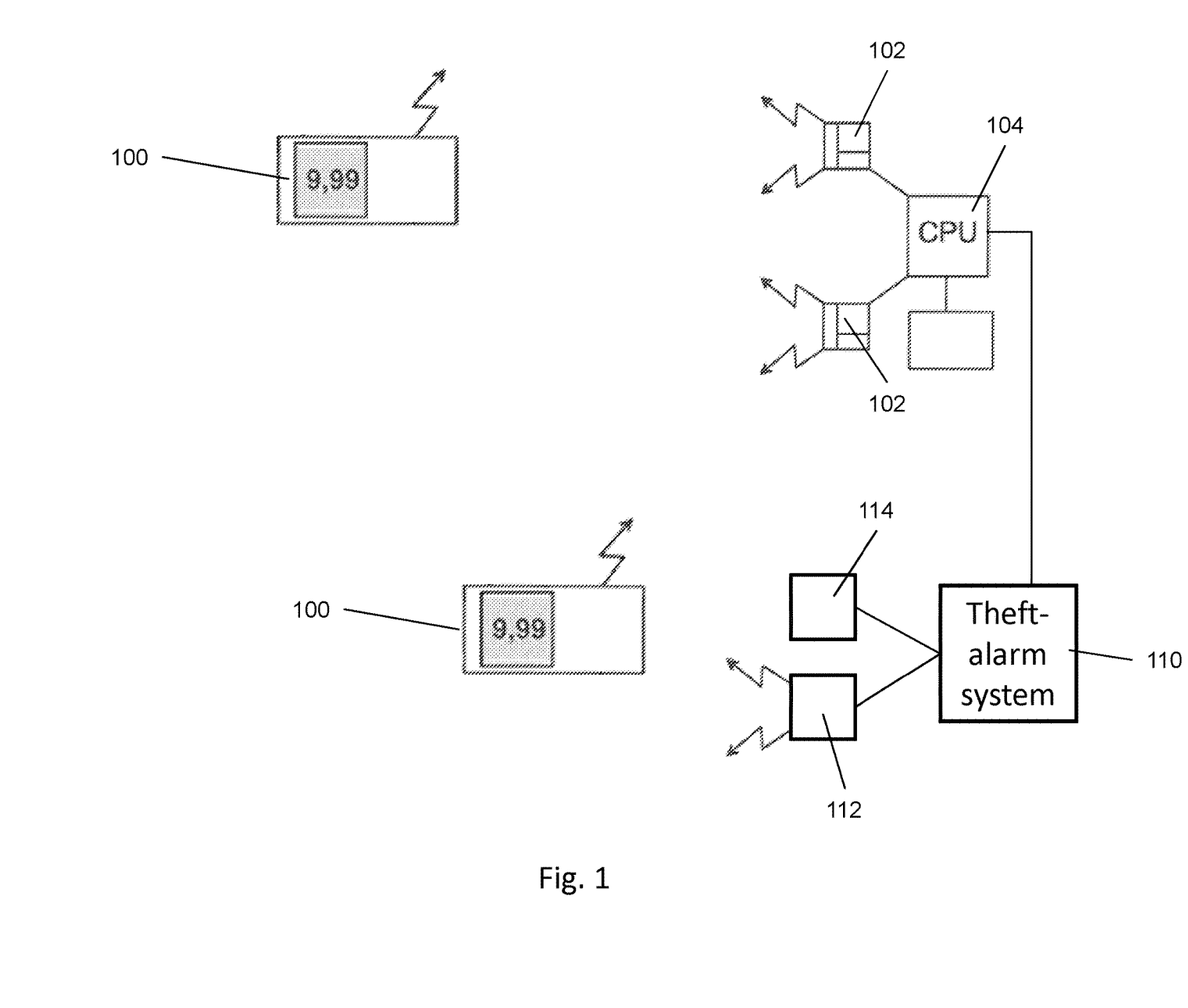
FIG. 1 presents a schematic and simplified view of an example arrangement of the electronic price label system in a supermarket or in corresponding sales premises.

FIG. 1 presents schematically, as an example, a typical arrangement of the electronic price label system in a supermarket or similar sale environment.

Electronic price labels 100 are located near products e.g. on edges of the product shelves or as hanging price displays such that they are easily perceivable for the customers.

Furthermore, the electronic price label system comprises at least a central processing unit 104 connected to a base station 102 or other communication means, via which it is possible to transmit, for example, updated price information and other control information to the electronic price label 100.

The electronic price labels communicate in a wireless manner with the base station. Wireless communication method may be based on any known wireless communication technology, but in order to save battery life of the electronic price labels, passive backscatter radio communication is preferred. In this approach the base stations actively send radio signals and instead of answering with active radio transmission, the electronic price label do not use a radio transmitter; instead, they answer by modulating the reflected power of the base station signal. The modulation is achieved, typically, by changing the load state of the antenna in the electronic price label, for example, by connecting and disconnecting the antenna between the ground and non-ground potential. This modulation of the backscattered signal allows for the electronic price label to answer to the base stations and further to the store level server. The system can be configured to use certain frequency band for communication between electronic price labels and base station(s), e.g. 868 MHz frequency band, 2.4 GHz frequency band or any other frequency band allowed to be used for an electronic price label system. In one embodiment of the invention the system can use multiple frequency bands for communication between electronic price label and base station(s) and/or different kind of diversity techniques. Electronic price label can use its antenna or one of its antennas for communicating with the base station with backscatter radio communication.

Each electronic price label can be identified by its own identification code for electronic price label system that the electronic price label in question knows to listen for in the transmission from the base station. After receiving new information, instructions or commands from the store server via base station, the electronic price label can acknowledge the reception of these instructions by using the reflected backscattering modulated properly and timely for the store level server to identify that the response is coming from the electronic price label in question. To facilitate that the store server may have a certain listening period after a transmission directed to a certain electronic price label for giving the module possibility to answer during that time.

In one embodiment of the invention communication module can comprise an active radio transmitter instead of backscatter radio communication means. In this embodiment the radio transmitter is preferably low power RF-transmitter or transceiver.

Information stored to electronic price labels and communication between the electronic price labels and base stations can be encrypted.

In the premises where the electronic price label system operates also electronic article surveillance system 110 can be used. The electronic article surveillance system 110 comprises at least one detection means 112 configured to detect electronic article surveillance tags. Detection means 112 can be e.g. gate alarms, security ports or other kind of detectors which are able to detect electronic article surveillance tags. The electronic article surveillance system can be a radio frequency based system and electronic article surveillance tag can be a radio-frequency tag such as an RFID-tag.

The electronic article surveillance system also comprises activation means 114 for changing state of detection means between activated-state and deactivated state. Activation means 114 comprise at least one sensor for detecting presence and/or movement of a person at certain area, e.g. at the exit area of a store. Activation means 114 can be e.g. a movement and/or presence sensor, an infrared gate sensor and/or a floor sensor.

When detection means 112 are in activated state they can detect electronic article surveillance tags. When detection means 112 are in deactivated state they send no radio signals and can't detect electronic article surveillance tags.

In the arrangement according to the invention the electronic surveillance system is activated only when there are persons in the area where electronic article surveillance system operates. When no-one is in detector area of electronic article surveillance system, electronic article surveillance system can be kept in deactivated state. When electronic surveillance system is deactivated, the electronic price label system is able to transmit information without interference from electronic surveillance system.

The electronic article surveillance system is configured to send status information of detection means to electronic price label system and/or to means controlling the electronic price label system and electronic price label system is configured to receive status information of detection means. The status information can indicate whether the detection means of the electronic article surveillance system are in activated state or deactivated state. The electronic article surveillance system can be able to send individual activation states of each of detection means and/or it can send information whether any detection means is in active state and information that all detection means are in deactivated state.

The electronic article surveillance system can send commands to electronic price label system e.g. to stop transmitting or begin transmitting. These commands can be e.g. in form of status information. When electronic article surveillance system is used to send commands to electronic price label system, the electronic article surveillance system can be considered a master device.

The electronic article surveillance system is configured to give an alarm signal if an active electronic article surveillance tag is detected by the detection means from the area where the detection means are able to detect the presence of an active electronic article surveillance tag.

In one embodiment the electronic article surveillance system comprises security ports and alarm signal is given based on the response from security ports when active electronic article surveillance tag is exported through the security port. The alarm can be made in this case if the electronic article surveillance tag is exported through the port. The activating means can monitor if there are any persons near the security port and if there are, activation means can keep security port active. If activation means detect no-one near security gate, security port can be kept disabled and thus it doesn't cause interference to electronic price label system.

Figure 2:
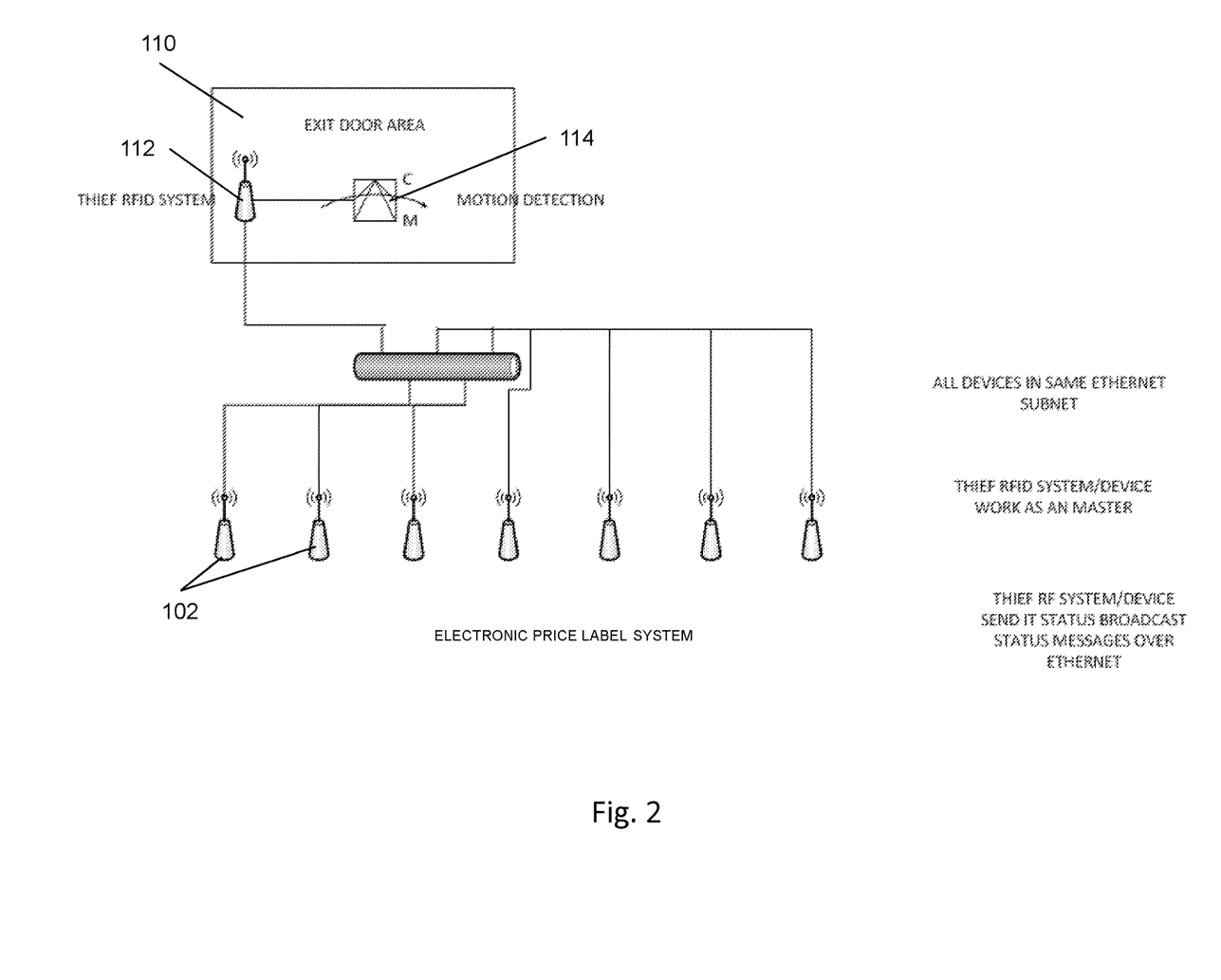
FIG. 2 presents a schematic and simplified view of an example arrangement of the electronic price label system in a supermarket or in corresponding sales premises in more detail.

FIG. 2 presents a more detailed example embodiment of an electronic price label system according to the invention. The system presented in FIG. 2 has similar basic elements as the system presented in FIG. 1 but the detection means 112 and activation means 112 of electronic article surveillance system 110, i.e. a thief RF-system in this embodiment, is arranged at the exit door area. The detection means 112 of the electronic article surveillance system configured to detect electronic article surveillance tags is an RFID-system and activation means 114 is a motion detection sensor. In the embodiment of FIG. 2 all devices can be in same network and e.g. same Ethernet subnet. The electronic article surveillance system can work as a master by controlling the electronic price labels and the base stations 102 of the electronic price label system and at which time instances base stations and electronic labels are allowed to transmit information. The electronic article surveillance system can send its status messages as status broadcast messages e.g. over the network such as Ethernet.

Figure 3:
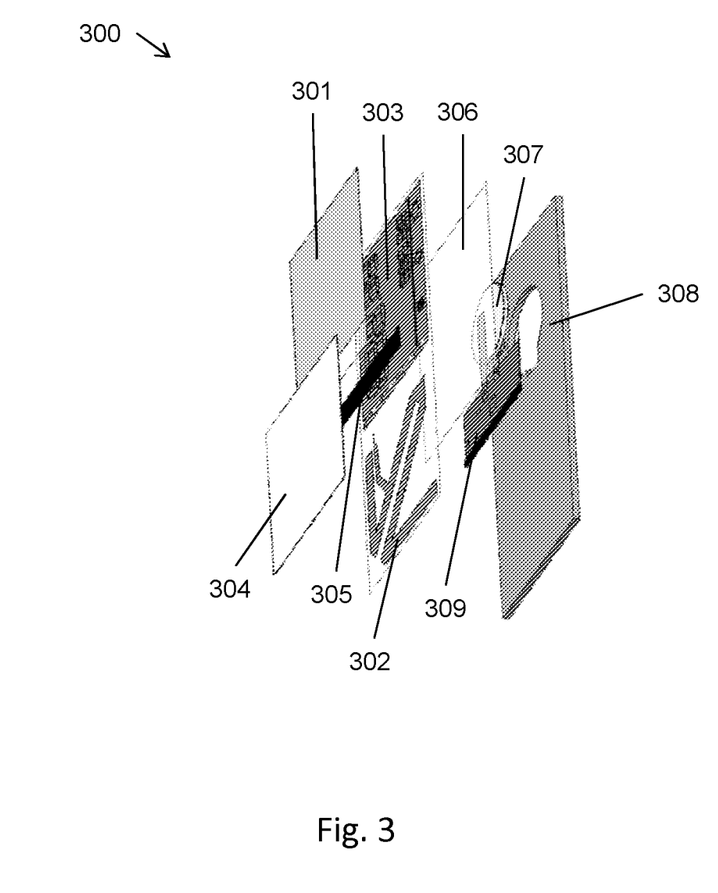
FIG. 3 presents an example implementation of an electronic price label.

FIG. 3 presents an example embodiment of an electronic price label 300. The electronic price label 300 has a layered structure. It consists essentially of a flexible e-paper display 301 comprising e-paper display material, a backplane layer 303 as a flexible circuit board having an electrode structure for controlling the display, a battery 307, which can be substantially rigid or flexible, and wherein the thickness of said battery is greater than the thickness of said flexible display layer 301 and the thickness of said flexible backplane layer 303, and a resilient layer 308 having a cut-out space for said battery 307, wherein said resilient layer 308 is arranged to provide a substantially even total thickness of said label.

Also energy harvesting methods may be used to provide energy to the electronic price label, such as solar or photovoltaic cells. Also capacitors, such as electric double-layer capacitors, i.e. supercacitors, can be used instead or with the battery. In one embodiment of the invention the energy source, such as battery, of the electronic price label can be changed. In one embodiment of the invention the electronic price label has an opening e.g. in the back side of the electronic price label, via which the energy source can be removed from the electronic price label and inserted to the electronic price label.

The display is arranged to display the information related to the product. Also other product information can be added to electronic price label such as name of the product, logo and/or some other information relating to the product. The information which is in the display can be e.g. price, sale price and/or discount.

One layer of the display is, for example, an active ink layer. The ink layer contains a number of microcapsules filled with liquid and containing, for example, substantially black particles with a positive surface charge and substantially white particles with a negative surface charge, whose location in the microcapsules is controlled by an electric field so that at the desired display segments, the black particles are on top, wherein said display segments look black when viewed from above, and at the other display segments, the white particles are on top, wherein these display segments look white when viewed from above. The background of the display consists of the same microcapsules, wherein, for example, the price information can be displayed as dark numbers against a light background, or vice versa, if desired. Such a display used can be, for example, the electrophoretic microcapsule display laminate disclosed in Finnish patent application No. FI 20050192. Instead of segment display type, the display type can also be pixel type display.

The electronic price label further comprises wireless communication capabilities with at least one antenna 302 consisting of any shape e.g. two triangular antenna patterns on the same flexible circuit board as the display control, as the ESL-module is implemented as semi-active RF tags that is powered from incident RF communicating via modulated backscatter, and a separate flexible circuit board. The electronic price label is configured to communicate with the antenna 202 with electronic price label system and electronic article surveillance system.

The battery 307 has been encapsulated in a cut-out space by laminating said display 301, backplane 303, control circuit board and resilient layers 308 together. Further, the display layer 301, the backplane layer 303, the resilient layer 308 and the battery 307 are located between two outside protective layers (not shown) forming a body of the electronic price label for an electronic price label suitable to be attached to a product. Also a protective layer 306 can be arranged at the bottom of the backplane layer 303 to prevent moisture from getting to display layer 301 which is sensitive to moisture variations. The rigid component has been attached to the separate flexible printed circuit board 309 operating as a submodule under the backplane and the antenna. Backplane layer 303 as a flexible circuit board having an electrode structure for controlling the display and separate flexible printed circuit board 309 can be considered to form control electronics of the electronic price label.

The backplane and the antenna circuit board 303 and the electronic price label control circuit board are patterned plastic films (PET or PC or PVC or polyimide) with patterned conductive copper layers. The forming and patterning of the conductors can be made using any method known as such for a person skilled in the art, for example by direct printing of conductive ink or by etching of a thin metal layer. The lower surface of the backplane 303 has display segment lead lines patterned in a similar way. Each display segment is electrically connected to a corresponding display segment lead line for example through a preferably laser processed via. Also other ways of providing feed-through vias are possible as is evident for a person skilled in the art. In order to establish an electrical contact from the backplane segments to the display front electrode, which is in this example on the front surface of the flexible electronic display web, an electrically conducting tape 305 is laminated on the backplane area acting as a front electrode feed line. Alternatively and instead of an electrically conducting tape 305, electrically conducting paste or similar material with adhesive nature may be dispensed on the backplane web to make contact with the front plane electrodes.

It's also possible to add further layers 304 to change the visual appearance of the electronic price label or to protect the electronic price label.

The electronic price label can have multiple memory locations for the information, for example for price information. The electronic price labels can also comprise multiple different views stored in the memory locations i.e. different pages that include different information to be displayed. Staff can have its own pages which can be displayed only with a special staff equipment. Also loyalty customers or other group of users can have own pages which can be activated using e.g. loyalty card. E.g. Loyalty Card holders can have special price displayed for them when loyalty card is brought close to the electronic price label.

Figure 4:
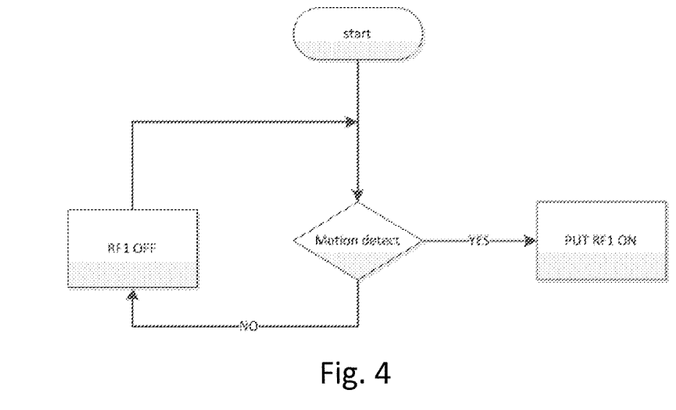
FIGS. 4-6 present flow charts about operation of the electronic price label system according to embodiments of the invention.
Figure 5:
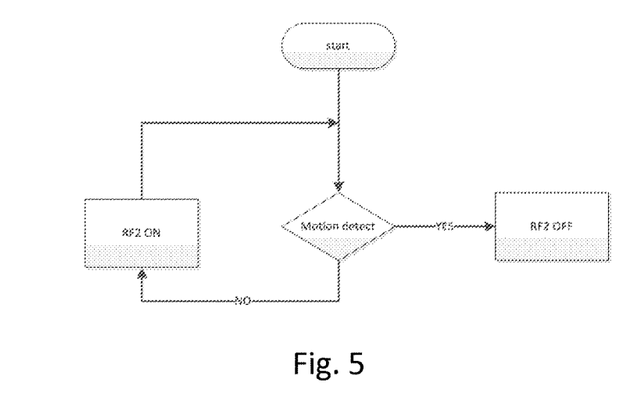
Figure 6:
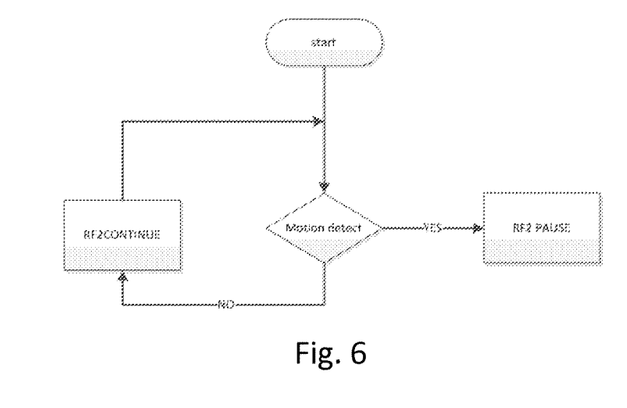

FIGS. 4-6 present in flow charts some example embodiments how the arrangement and system of the invention can operate to reduce the effect of interference between electronic price labels and electronic article surveillance system.

The electronic price label system is connected to an electronic article surveillance system which comprises detection means which are able to detect electronic article surveillance tags, and which electronic article surveillance system further comprises activation means for changing state of detection means between activated-state and deactivated state.

The electronic price label system can receive status information of the detection means from the electronic article surveillance system. The electronic surveillance system is in activated state (RF1 ON) always when motion/presence of someone is detected by the activation means. When the activation means detect no motion/presence of someone, the detector means can be kept in deactivated state (RF1 OFF). This is illustrated in FIG. 4.

The electronic price label system starts transmitting transmissions from base stations and electronic labels (RF2 ON) only when detection means of the electronic article surveillance system are in deactivated-state i.e. when activation means detect no motion/presence of someone. If detector means are in activated state, i.e. when activation means detect motion/presence of someone, base stations and electronic labels are not transmitting (RF2 OFF). This is illustrated in FIG. 5. The electronic labels can transmit transmissions to a base station of an electronic price label system by reflecting back a signal it receives.

In one embodiment of the invention the electronic price label system is configured to stop new and/or ongoing transmissions from base stations and electronic labels when state of detection means is changed from deactivated to activated. When state of detection means is changed to activated state, i.e. activation means detect motion/presence of someone, the electronic labels and base stations pause their transmissions (RF2 PAUSE). When state of detection means is changed to deactivated, i.e. activation means detect no motion/presence of someone, the electronic labels and base stations continue their transmissions (RF2 CONTINUE). This is illustrated in FIG. 6.

In one embodiment of the invention the electronic price label system continues ongoing transmission and stops transmitting after ongoing transmissions have been transmitted. This way the system makes no retransmissions when the detection means are activated.

In one embodiment of the invention the detection means of the electronic article surveillance system can otherwise be constantly in the activated state but periodically the detection means can be switched to a deactivated state so that the electronic price label system is able to transmit information from base stations and electronic labels. When the detection means is constantly in activated state, the system doesn't need to keep the activation means switched on at all if so desired. When the detection means are periodically switched to a deactivated state, the activation means are used to monitor if there are any persons nearby the detection means. If there is any person detected, the activation means change the state of the detection means to activated and the system operates in a same way as described by this application in context with the other embodiments of the invention. When the base stations and electronic labels have transmitted their information, the detection means of the electronic article surveillance system can once again be switched to the constant activated state.

In one embodiment of the invention the electronic price label comprises an electronic article surveillance part, e.g. a tag, which can be detected by an electronic article surveillance system. This kind of electronic price label can always respond to the query of the detection means of the electronic article surveillance system and this way an alarm can always be generated reliably when active electronic article surveillance part is in the range of the detection means.

In the embodiment where the electronic price label comprises an electronic article surveillance part, the electronic price label can comprise two integrated circuits, e.g. ASICs or microprocessors, which first integrated circuit is configured to control the communication module for receiving information from base station related information and the second integrated circuit is configured to control the electronic article surveillance part. The integrated circuits can be connected to each other and they can send information to each other. They can also switch off and on each other. If one receives information it can forward it to another integrated circuit.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention. Embodiments described in the description in combination with other embodiments can be also used as separate embodiments.

The invention claimed is:

1. An arrangement for reducing the effect of interference at radio frequencies in an electronic price label system, the arrangement comprising:
an electronic price label system, which comprises a base station equipped with at least a radio transmitter and a radio receiver and a set of electronic price labels that receive and reflect back radio signals from the base station,
wherein the electronic price label system is connected to an electronic article surveillance system which comprises a first sensor to detect electronic article surveillance tags, and a second sensor detecting the presence or movement of a person for changing a state of the first sensor between an activated state and a deactivated state, and
wherein the electronic article surveillance system is configured to send status information of the first sensor to the electronic price label system,
wherein the electronic price label system is configured to receive status information of the first sensor, and
wherein the electronic price label system is configured to start transmitting transmissions from base stations and/or electronic price labels only when the first sensor of the electronic article surveillance system is in the deactivated state.

2. An arrangement according to claim 1 wherein the electronic price label system is configured to stop new and/or ongoing transmissions from base stations and/or electronic price labels when the state of the first sensor is changed from deactivated to activated.

3. An arrangement according to claim 1 wherein the electronic price label system is configured to continue ongoing transmission from base stations and/or electronic price labels and stop transmitting after ongoing transmissions have been transmitted.

4. An arrangement according to claim 1 wherein the first sensor is configured to detect electronic article surveillance tags when the first sensor is in the activated state, and wherein the first sensor comprises security ports.

5. An arrangement according to claim 1 wherein the second sensor is at an exit area of a store.

6. An arrangement according to claim 5 wherein the second sensor is a movement sensor, an infrared gate sensor and/or a floor sensor.

7. An arrangement according to claim 1 wherein the electronic price label system and the electronic article surveillance system are configured to operate on a same frequency band.

8. An arrangement according to claim 1 wherein the electronic article surveillance system is a radio-frequency system and the electronic article surveillance tag is a radio frequency tag such as an RFID-tag.

9. An arrangement according to claim 1 wherein the electronic price labels communicate with the base station of the electronic price label system by reflecting back a signal it receives.

10. An arrangement according to claim 1 wherein the electronic price label comprises a display and the display of the electronic price label is an electronic ink display, such as a bistable E-Ink-segment display.

11. An arrangement according to claim 1 wherein the electronic price label is configured to display product related information in its display, wherein product related information is a price of the product, a sale price of the product and/or amount of discount.

12. An arrangement according to claim 1 wherein the electronic price label system and the electronic article surveillance system are configured to operate on 868 MHz frequency band, 2.4 GHz frequency band or any other frequency band allowed to be used for the electronic price label system.

13. An arrangement according to claim 2 wherein the electronic price label system is configured to continue ongoing transmission from base stations and/or electronic price labels and stop transmitting after ongoing transmissions have been transmitted.

14. An arrangement according to claim 2 wherein the first sensor is configured to detect electronic article surveillance tags when the first sensor is in the activated state and wherein the first sensor comprises security ports.

15. An electronic price label system comprising:
a plurality of electronic price labels which receive and reflect back radio signals from a base station,
at least one base station equipped with at least a radio transmitter and a radio receiver and configured to send and receive information with any of the electronic price labels,
wherein the electronic price label system further comprises an electronic article surveillance system comprising at least one first sensor configured to detect electronic article surveillance tags and a second sensor detecting the presence or movement of a person for changing a state of the first sensor between an activated state and a deactivated state,
wherein the electronic article surveillance system is configured to send status information of the first sensor to the electronic price label system,
wherein the electronic price label system is configured to receive status information of the first sensor, and
wherein the electronic price label system is configured to start transmitting transmissions from base stations and/or electronic price labels only when the first sensor of the electronic article surveillance system is in the deactivated state.

16. An electronic price label system according to claim 15 wherein the system is configured to give an alarm signal.

17. An electronic price label system according to claim 16 wherein the first sensor of the electronic article surveillance system comprises security ports and the alarm signal is given based on the response from the security ports when an active electronic article surveillance tag is exported through the security port.

18. A method for reducing the effect of interference at radio frequencies in an electronic price label system, which electronic price label system comprises a base station equipped with at least a radio transmitter and a radio receiver as well as a set of electronic price labels that receive and reflect back radio signals from the base station, wherein the electronic price label system is connected to an electronic article surveillance system which comprises a first sensor to detect electronic article surveillance tags, and which electronic article surveillance system further comprises a second sensor detecting the presence or movement of a person for changing a state of the first sensor between an activated state and a deactivated state, and wherein the electronic article surveillance system sends status information of the first sensor to the electronic price label system, wherein the electronic price label system receives status information of the first sensor, and wherein the electronic price label system starts transmitting transmissions from base stations and/or electronic price labels only when the first sensor of the electronic article surveillance system are in the deactivated state.

19. A method according to claim 18 wherein the electronic price label system stops new and/or ongoing transmissions from base stations and/or electronic price labels when the state of the first sensor is changed from deactivated to activated.

20. A method according to claim 18 wherein the electronic price label system continues ongoing transmission from base stations and/or electronic price labels and stops transmitting after the ongoing transmissions have been transmitted.

* * * * *